US008826771B2

(12) United States Patent
Wiklof (10) Patent No.: US 8,826,771 B2
(45) Date of Patent: Sep. 9, 2014

(54) ENERGY STORAGE DEVICE

(75) Inventor: Christopher A. Wiklof, Everett, WA (US)

(73) Assignee: Empire Technology Development LLC, Wilmington, DE (US)

( * ) Notice: Subject to any disclaimer, the term of this patent is extended or adjusted under 35 U.S.C. 154(b) by 564 days.

(21) Appl. No.: 12/881,727

(22) Filed: Sep. 14, 2010

(65) Prior Publication Data
US 2012/0060643 A1 Mar. 15, 2012

(51) Int. Cl.
*F16F 15/16* (2006.01)
*F16F 15/10* (2006.01)

(52) U.S. Cl.
USPC .................................. 74/573.11; 74/572.2

(58) Field of Classification Search
USPC ............ 74/5.95, 572.2, 573.1, 574.4, 572.21, 74/572.1, 573.13, 572.11, 573.11; 464/180; 310/74, 153; 384/100, 109, 384/118; 318/150, 161; 180/165
IPC ............................................ F16F 15/173,15/16
See application file for complete search history.

(56) References Cited

U.S. PATENT DOCUMENTS

| 1,718,539 | A | * | 6/1929 | Dieter ............................... 74/5.7 |
| 3,447,382 | A | * | 6/1969 | Eyman ............................ 73/490 |
| 3,949,556 | A | * | 4/1976 | Wallis ............................. 60/709 |
| 4,543,037 | A | * | 9/1985 | Etsion ............................. 415/90 |
| 4,645,414 | A | * | 2/1987 | DeHart et al. .................. 415/83 |
| 4,996,016 | A | | 2/1991 | Walls et al. |
| 5,199,391 | A | * | 4/1993 | Kovalenko .................. 123/43 B |
| 5,285,699 | A | | 2/1994 | Walls et al. |
| 5,614,777 | A | | 3/1997 | Bitterly et al. |
| 6,019,515 | A | | 2/2000 | Fujii et al. |
| 6,213,270 | B1 | * | 4/2001 | Jackel et al. ................ 192/70.17 |
| 6,262,505 | B1 | | 7/2001 | Hockney et al. |
| 6,402,380 | B1 | | 6/2002 | Sogard |
| 2011/0311347 | A1 | * | 12/2011 | Marsden ........................... 415/1 |

FOREIGN PATENT DOCUMENTS

JP 11190271 A * 7/1999 .............. F16F 15/30

OTHER PUBLICATIONS

Johnny Gonzales "Power on the Fly" Engineering & Technology, Mar. 22-Apr. 4, 2009 [online: www.theiet.org/engtechmag].
John Gartner "Energy Storage Market Charges Ahead" Jul. 13, 2009 Reuters [online: http://www.reuters.com/article/mnEnergy/idUS4213453666200907136].
Lawrence A. Hawkins, et al "Application of Permanent Magnet Bias Magnetic Bearings to an Energy Storage Flywheel" [online: http://00574ee.netsolhost.com/Paper_PDFs/5ismst.pdf], Dec. 1-3, 1999.
Leland E. Teschler "Modular Air Bearings for Motion Control" Machine Design, Jul. 21, 2009 [online: http://machinedesign.com/article/modular-air-bearings-formotion-control-0721].
Drew Devitt "Bigger role for Radial Air Bearings" Machine Design, Jul. 23, 2009, pp. 44-50 [online: http://www.newwayairbearings.com/New-Way-In-The-News-2009-July-23-Machine-Design-Magazine].
Kousuke Hikichi, et al "Hydroinertia Gas Bearings for Micro Spinners" The Fourth Int'l Workshop on Micro and Nanotechnology for Power Generation and Energy Conversion Applications, PowerMEMS 2004, Nov. 28-30, 2004, Kyoto, Japan.
Koeneman, P.B. et al "Feasibility of micro power supplies for MEMS" Journal of Microelectromechanical Systems, Dec. 1997, vol. 6 Issue: 4, pp. 355-362.

* cited by examiner

*Primary Examiner* — Thomas Diaz
(74) *Attorney, Agent, or Firm* — Maschoff Brennan (57) ABSTRACT

Energy storage devices for storing energy are provided. An energy storage device includes a flywheel disposed in a chamber of a journal. A gas bearing is formed between an outer face of the flywheel and an inner face of the journal. The gas bearing exerts a compressive force on the flywheel, which allows for higher rotational velocities and higher energy storage.

19 Claims, 3 Drawing Sheets

ENERGY STORAGE DEVICE

BACKGROUND

Many things that are considered vital to our everyday lives require energy. Computers, cell phones, light bulbs, cars, communication systems, etc., all require energy to operate. Energy, however, is not free. Energy must come from somewhere. Energy also comes at a cost, which can be expressed both economically and environmentally. Unfortunately, the cost of energy is increasing.

Because of the economic and/or environmental cost of energy, research is being done to discover how to improve the ways that energy is used. More specifically, research is being done to improve the efficiency at which energy is used, stored, and generated.

Improving the way that energy is used can include the use of energy storage devices. Energy storage devices come in different forms and store energy in different ways. Batteries, for instance, store energy chemically and are increasingly rechargeable. Other devices such as flywheels may store energy kinetically.

Conventional energy storage devices typically have limits on the amount of energy that can be stored. These limits are often associated with physical and/or chemical characteristics of the energy storage device. In other words, the characteristics of energy storage devices themselves often place limits on the energy storing capabilities. Overcharging a battery, for instance, often reduces the effectiveness of the battery and may render the battery inoperable or unsafe. As a result, battery chargers are often designed to stop the charging process before overcharging can occur.

The energy storage capability of flywheels are similarly limited. While the kinetic energy stored in a flywheel can be augmented by increasing the rotational velocity of the flywheel, storing too much energy in the flywheel often results in the destruction of the flywheel itself. As a result, the amount of energy that can be stored is limited. In addition, energy storage devices often suffer from parasitic leaks that drain the stored energy. The bearings in a conventional flywheel, for instance, create a drag that drains the stored energy over time.

SUMMARY

Embodiments relate to energy storage devices and systems. In an illustrative embodiment, an energy storage device includes a journal and a flywheel. The flywheel is disposed in a chamber of the journal. Within the chamber, the flywheel rotates and stores energy kinetically. A gas bearing is between the journal and the flywheel. The gas bearing exerts a compressive force on the flywheel.

In another illustrative system, an energy storage system includes an energy storage device, which includes a flywheel disposed in a journal. A gas supply provides gas to the energy storage device. The gas forms a gas bearing between the flywheel and the journal and also exerts a compressive force on the flywheel. A controller controls a flow of the gas to the energy storage device and can also control the pressure or compressive force exerted by the gas bearing.

In another illustrative embodiment, a method for providing a gas bearing in an energy storage device includes providing the gas to an energy storage device. The energy storage device is configured with a flywheel disposed in a chamber of a journal. The gas forms a gas bearing between an outer face of the flywheel and an inner face of the journal and exerts a compressive force on the flywheel. The rotational velocity of the flywheel is monitored and the gas is controlled based on the rotational velocity of the flywheel.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Embodiments disclosed herein relate to energy storage and energy storage devices including flywheel energy storage devices ("FES"). An FES converts energy (e.g., electrical, fluid, mechanical energy) to kinetic energy through shaft rotation. The energy that can be stored in a conventional FES is often limited by the maximum rotational velocity. Embodiments disclosed herein augment the maximum rotational velocity of an FES by holding the FES under a compressive force. The compressive force can be generated with a fluid bearing. Holding the FES under the compressive force enables the maximum rotational velocity to be increased and corresponds to an increase in the energy stored by the FES. The fluid can be either a gas or a liquid. Although embodiments are discussed in the context of a gas, a liquid fluid may also be used in some embodiments.

An FES has broad application to, by way of example only, renewable energy sources, ground transportation vehicles, and power grids. FES systems can provide high density storage and be incorporated into compact spaces and even stored underground.

Figure 1:
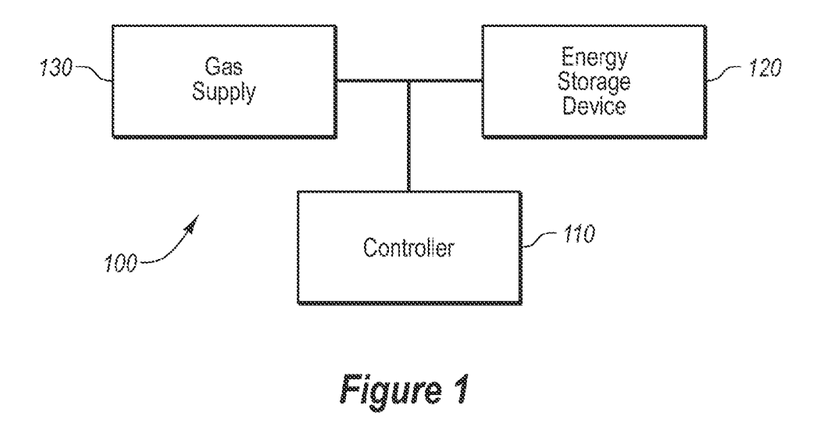
FIG. 1 shows an illustrative embodiment of an energy storage system for storing energy.

FIG. 1 shows an illustrative embodiment of an energy storage system 100 for storing energy. An energy storage system 100 includes a gas supply 130, a controller 110 and an energy storage device 120. The energy storage system 100 can convert electrical, fluid, and/or mechanical energy (or other energy type) to another form of energy for storage.

The energy storage system 100 may store energy kinetically in the energy storage device 120. The energy storage device 120 may store kinetic energy using a rotating mass. The energy storage system 100 provides a compressive force to the energy storage device 120 and more specifically to the rotating mass. The compressive force augments the amount of energy that can be stored in the energy storage device 120. The amount of energy stored in the energy storage device 120 is comparatively greater than can be achieved without the compressive force.

More specifically, a rotational limit (e.g., rotational velocity) of the rotating mass is often subject to material strength/inertia optimization in the rotor, shaft and bearings, resistance to centrifugal force, tensile failure of the rotational mass, or the like or any combination thereof. Loading the rotating mass with a compressive force can augment the rotational limit of the rotational mass. For instance, the compressive force enables the rotational velocity to be increased while preventing tensile failure at the higher rotational velocity. The higher rotational velocity translates to increased stored energy.

The gas supply 130 can be air, nitrogen, or any other suitable gas (or combination of gases) and can be obtained from a stored tank, from the environment, or through a renewable gas source, such as a compressor and storage tank arrangement. The gas supply 130 may provide different gases at different times. Gas is supplied to the energy storage device 120 to generate the compressive force in the energy storage device 120.

The controller 110 may include and/or control the pressure of the gas, the flow rate of the gas, the rotational velocity of the energy storage device 120, or the like or any combination thereof. The controller 110 may be configured to automatically adapt to changing conditions in the gas and/or the energy storage device 120. For instance, the controller 110 can control the rotational velocity of the energy storage device 120, which may impact how the gas is provided. Lower pressures may correspond to lower rotational velocities. The controller 110 may also control the type of gas provided by the gas supply 130 and/or on characteristics of the gas such as viscosity. The decision may be influenced by the rotational velocity of the energy storage device 120.

Figure 2:
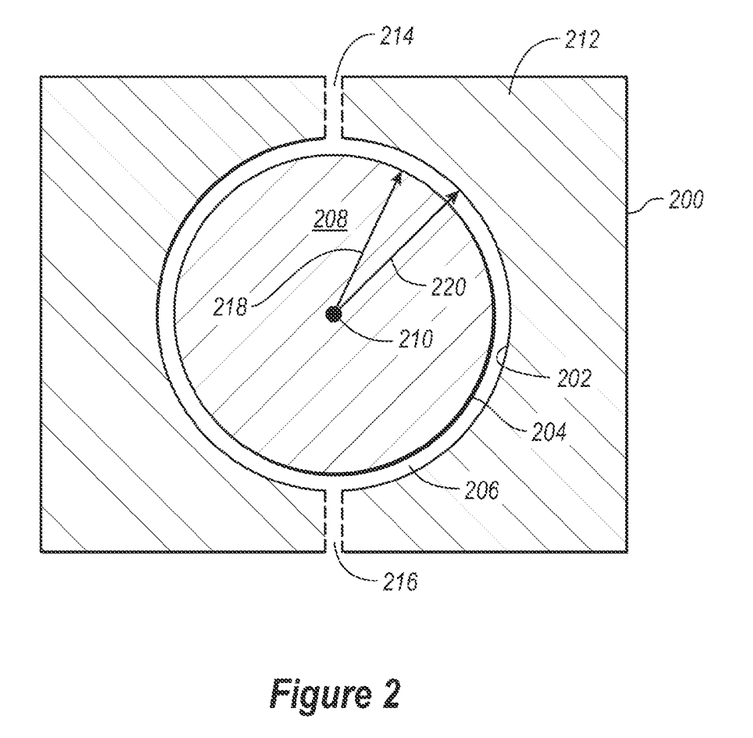
FIG. 2 shows an illustrative embodiment of an energy storage device that includes a rotating flywheel.

FIG. 2 shows an illustrative embodiment of an energy storage device 200 that includes a rotating flywheel 208. The energy storage device 200 is an example of the energy storage device 120. The energy storage device 200 includes a journal 212 and the flywheel 208. The journal 212 provides a body or casing to form a chamber 222 within which the flywheel 208 is located and within which the flywheel 208 rotates. The flywheel 208 is an example of a rotating mass.

Ports 214 and 216 are formed in the journal 212 and provide access to the chamber 222. The ports 214 and 216 can be used to generate a compressive force on the flywheel 208. For instance, gas may be delivered to the energy storage device 200 through the ports 214 and allowed to exit the energy storage device 200 through the ports 216.

The flywheel 208 rotates about an axis 210. The flywheel 208 can be formed in multiple different shapes that accommodate rotation. The flywheel 208, for instance, may be cylindrical, cone-shaped, or the like or any combination thereof. The chamber 222 is typically shaped like the flywheel 208, but is slightly larger in order to accommodate the flywheel 208.

The flywheel 208 may be formed from steel or another relatively high density material. The flywheel 208 may also be formed from multiple materials and/or in multiple layers including laminate layers. The density of the flywheel 208 may therefore vary in at least a radial direction from the axis 210. In one example, the shape of the flywheel 208, the composition of the flywheel 208, and/or the axis 210 are selected to maximize the moment of inertia.

In some embodiments, the flywheel 208 is formed as a flat disk. In other embodiments, the flywheel 208 may include thickened areas near its outer diameter and a thinned web and/or spokes extending from the hub to the outer diameter. Distributing mass farther from the center of the flywheel increases its moment of inertia for a given total mass.

In one example, the flywheel 208 may be formed of concrete, metal filled thermoplastic, or another material that is relatively high density, strong in compression, and/or weak in tension. When the flywheel 208 is under compression, concrete may be used to store energy. When a center shaft is used to support the weight of a concrete flywheel, substantially all of the flywheel can be kept under compression. This can reduce the cost of the flywheel because concrete is often less expensive than other materials such as steel, iron, etc. In one example, the concrete could be pre-stressed radially by casting the concrete over radially oriented rebar under tension.

FIG. 2 illustrates that the flywheel 208 includes an outer face 204. The face 204 of the flywheel 208 is opposite an inner face 202 of the journal 212. The face 204 is separated from the inner face 202 by a gap 206. The gap 206, in one example, corresponds to a difference between a radius 218 of the flywheel 208 from the axis 210 to the face 204 and an internal radius 220 of the journal 212 from the axis 210 to the inner face 202.

Dimensions of the gap 206 may change according to a rotational velocity of the flywheel 208 and the pressure of the gas. When the flywheel 208 is at rest, the gap 206 may be relatively large. When the flywheel 208 is rotating, the flywheel 208 may undergo elastic strain or elastic deformation to shrink the gap 206. For example, the gap 206 at rest may be on the order of about a millimeter while the gap 206 at rotational velocity may be on the order of about 200 micrometers. Preferably, the flywheel 208 does not contact the inner face 202 of the journal 212 during rotation. Optionally, in high speed applications where rotational velocity can exceed Mach 1, the gas bearing may be configured as a hydroinertia gas bearing to maintain high gas pressure. One of skill in the art can appreciate that the materials of the flywheel 208 and the dimensions of the gap 206 can be predetermined or designed. The foregoing dimensions are provided by way of example only and not limitation.

Gas that is pumped in through the ports 214 may be pressurized. In addition, the rotation of the flywheel 208, combined with the configuration of the outer face 204 and/or the inner face 202, may hydrodynamically increase the pressure of the gas or otherwise present in the energy storage device 200. In other words, the rotation of the flywheel 208 can increase the pressure in the energy storage device 200. Typically, gas provided through the ports 214 is at a higher pressure than the pressure of the gas exiting the energy storage device 200 through the ports 216.

Figure 3:
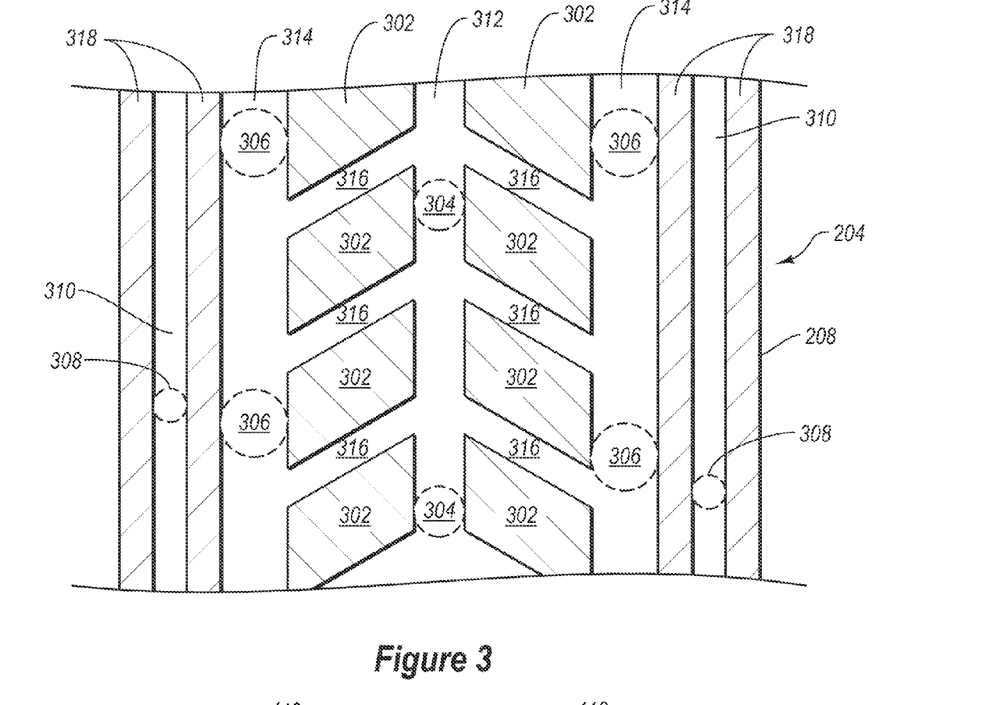
FIG. 3 shows an illustrative embodiment of an outer face of the a rotating flywheel in an energy storage device.

FIG. 3 shows an illustrative embodiment of an outer face 204 of the flywheel 208. FIG. 3 illustrates gas bearing features that assist in forming a gas bearing between the outer face 204 and the journal 212. The gas bearing features may include channels 316, a gas inlet channel 312, gas outlet channels 314, vacuum channels 310, and/or bearing pads 302. The number of the channels 316, the gas inlet channel 312, the gas outlet channels 314, the vacuum channels 310, and the bearing pads 302 can vary according to a configuration of the outer face 204.

FIG. 3 also illustrates ports 304, 306, and 308 that are formed in the journal 212 and are illustrated in dashed lines. The ports 304, 306, and 308 are examples of the ports 214 and/or 216. In this example, the ports 304 are gas inlet ports. Gas is provided to the energy storage device 200 and more specifically to the chamber 222 through the ports 304. The ports 306 are examples of gas outlet ports. Gas exits the energy storage device through the ports 306. The ports 308 are vacuum ports and can maintain a vacuum or near-vacuum in the channels 310 and in other locations of the chamber 222. The number of each of the ports 304, 306, and 308 can vary. For example, the energy storage device 200 may include one or more gas inlet port 304 and one or more gas outlet ports 306, and one or more vacuum ports 308.

The gas inlet ports 304 are used to provide a gas to at least the bearing pads 302 at sufficient pressure to create or form a gas bearing that may also form a compressive force on the flywheel 208. The pressure may be, by way of example only, on the order of around 8000 PSI (551.58 bars) or between 7000 PSI (482.63 bars) and 9000 PSI (620.53 bars). One of skill in the art can appreciate, with the benefit of the present disclosure, that additional pressures and/or gases (or other fluids) may be used to generate or provide a gas bearing in the energy storage device. In one example, the pressure may be less than 7000 PSI (482.63 bars).

The pressure of the gas provided through the gas inlet ports 302 may be at a lower pressure that is increased hydrodynamically by rotation of the flywheel 208. The pressure in the energy storage device 200 can be increased/decreased over time, held relatively constant, controlled via the relative sizes of the ports 304 and 306, controlled via a flow rate of the gas, or the like or any combination thereof.

The gas inlet channel 312 and the gas outlet channels 314 may be continuous on the face 204 of the flywheel 208. Thus, the channels 312 and 314 are forms around a circumference of the flywheel 208. The flow of gas may also be continuous. Thus, the gas inlet channel 312 can receive pressurized gas from the gas inlet ports 304 continuously. As the flywheel 208 rotates, the gas inlet ports 304 supply the gas at pressure sufficient to provide gas to the bearing pads 302 and form a gas bearing during rotation of the flywheel 208. More specifically, the gas generates a compressive force to the flywheel 208 that generally acts toward the center axis of the flywheel 208.

In operation, gas is pumped in through the gas inlet ports 304 at one or more pressures. For example, at low speed the gas may be held substantially at atmospheric pressure. At higher rotational velocities, such as velocities where elastic strain of the flywheel is encountered or at velocities where flywheel tensile limits are approached, the gas pressure may be increased. According to embodiments, gas may be provided at one or more pressures up to about 6000 PSI (413.69 bars). According to another embodiment, the gas pressure is held constant at about 6000 PSI (413.69 bars). The gas flows along the gas inlet channel 312 and the transverse channels 316 to the gas outlet channels 314. The gas outlet channels 314 may be vented, via the ports 306, to atmospheric pressure or back to the gas supply.

Gas in at least one of the channels 312, 314, and 316 seeps over the bearing pads 302 during rotation and establishes a gas bearing in the energy storage device. In effect, the gas forms a film between the bearing pads 302 and the inner face 202 of the journal 212. The rotation of the flywheel 208 increases the pressure hydrodynamically. The relative movement between the flywheel 208 and the journal 212 can pressurize the gas between the bearing pads 302 and the inner face 202. The channels 312, 314, and 316 form a path from the ports 304 to the ports 306.

In one example, the gas provided through the gas inlet ports 304 can be provided at higher pressures, which in turn may increase pressures between the bearing pads 302 and the journal. The gas that forms the gas bearing also provides compressive pressures on the rotating flywheel 208 with very low inertial loss. As previously stated, the rotation of the flywheel 208 can be used to generate or achieve the desired pressure in the energy storage device.

The gas provided through the gas inlet ports 304 may be vented via the gas outlet ports 306 to atmosphere or other pressure. In some instances, the gas is recycled. The pressurization levels in the energy storage device 200 can be achieved, in one example, by controlling the relative sizes of the gas inlet ports 304 and the gas outlet ports 306 and/or the gas flow rate and/or by machining the gap 206.

The bearing pads 302 are formed to have a trapezoidal shape in FIG. 3. The channels 316 are formed in the outer face 204 in a slanted or diagonal direction relative to a direction 320 of rotation. However, the bearing pads 302 can have other shapes including, by way of example only, rectangular, triangular, and the like. Further the channels 316 can be oriented in any direction relative to the direction 320 of rotation and may be curved or non-straight.

Figure 4:
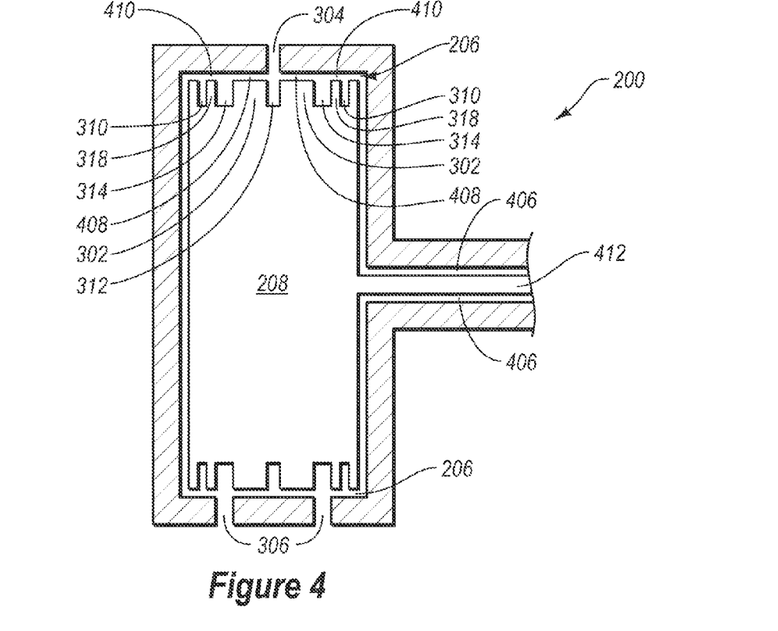
FIG. 4 shows an illustrative cross sectional view of the energy storage device and illustrates a gas bearing in the energy storage device.

FIG. 4 shows an illustrative cross-sectional view of the energy storage device 204 and illustrates a gas bearing 416 in the energy storage device. FIG. 4 illustrates that the channels 310, 312, and 314 have a depth and that the channels 312, and 314 are formed in the outer face 204 to define the shape and size of the bearing pads 302. Generally, the size of the channels 310, 312, and 314; and the size of the ports 304, 306, 308 is selected to be large relative to bearing pad 302 clearance. For example, channels 310, 312, 314 and ports 304, 306, 308 may be formed respectively as circle segments and circles having radii of at least 5 times bearing clearance, or about 5 millimeters or greater when the gap is on the order of one millimeter. According to an embodiment, the radii are about 10 millimeters. The gas provided through the gas inlet port 304 is drawn into spaces 408 between the bearing pads 302 and the inner face 202 of the journal 212. The gas in the spaces 408 forms at least a part of the gas bearing 416 for the energy storage device 200.

Bearing pads 318 are continuous on the outer face 204 of the flywheel 208. Because no channels are formed between the bearing pads 318, the vacuum channels 310 are separated from the gas outlet channels 314 by the bearing pads 318. The bearing pads 318 make it is easier to maintain a vacuum in the channels 310. The vacuum ports 308 enable a gap 414 next to the flywheel to remain under vacuum. The vacuum ports 308 can create a vacuum in the gap 414 to reduce the drag experienced by the flywheel 208. This can reduce energy leakage (or parasitic energy losses) from the energy storage device while providing a compressive force to the flywheel 208. More specifically, the gap 414 between the sides of the flywheel 208 and the journal 212 are under vacuum or near vacuum while the gas bearing 416 is present in the gap 206 between the outer face 204 and the inner face 202 of the journal 212. The vacuum channels 310 can also scavenge gas leaks so as to confine high pressure gas to the bearing surface defined between the flywheel periphery and the journal. This can reduce or eliminate requirements of portions of the housing non-radial to the flywheel to hold pressurized gas.

Because the bearing pads 318 do not contact the inner face 202 of the journal 212 in one embodiment, gas may escape into the vacuum channel 310 via the gap 410. However, the gas outlet ports 306 are likely to intercept most of the gas volume prior as it reaches the vacuum channels 310 to maintain the vacuum or near vacuum. The vacuum channels 310 can be kept at a vacuum or at a near vacuum through the vacuum ports 308. The pressure in the vacuum channels 308 may not be a perfect vacuum, but is typically lower than the pressure in the channels 314. In an embodiment, the gas inlet ports 304 are often placed as far as possible from the vacuum channels 310.

FIG. 4 thus illustrates that the gas forms the gas bearing 416 in the gap 206. As the pressure of the gas increases, the gas bearing exerts a compressive force (or compressive load) on the outer face 204 of the flywheel 208. The compressive force can enable the flywheel 208 to rotate at higher rotational velocities before tensile failure of the flywheel 208. For example, higher rotational velocities present a risk that the flywheel 208 will delaminate or deteriorate due to radial tensile strain. The compressive force provided by the gas bearing disclosed herein can reduce this risk and enable higher rotational velocities.

Further, the compressive force can be adjusted over time or according to the current rotational velocity of the flywheel 208. By controlling the pressure of the gas and/or the rotational velocity, energy leakage can be minimized and any energy expended to maintain the energy storage device 200 (e.g., to pump the gas) can be managed.

FIG. 4 also illustrates that the shaft 412 may be supported by a gas bearing in a gap 406. Alternatively, the gap 406 may be under vacuum.

In one embodiment, the gas may be replaced with a liquid fluid to provide a hydraulic bearing. While frictional losses of the hydraulic bearing may be higher, the compressive force of a liquid or hydraulic bearing may also be greater to enable more energy storage in the energy storage device 200.

Figure 5:
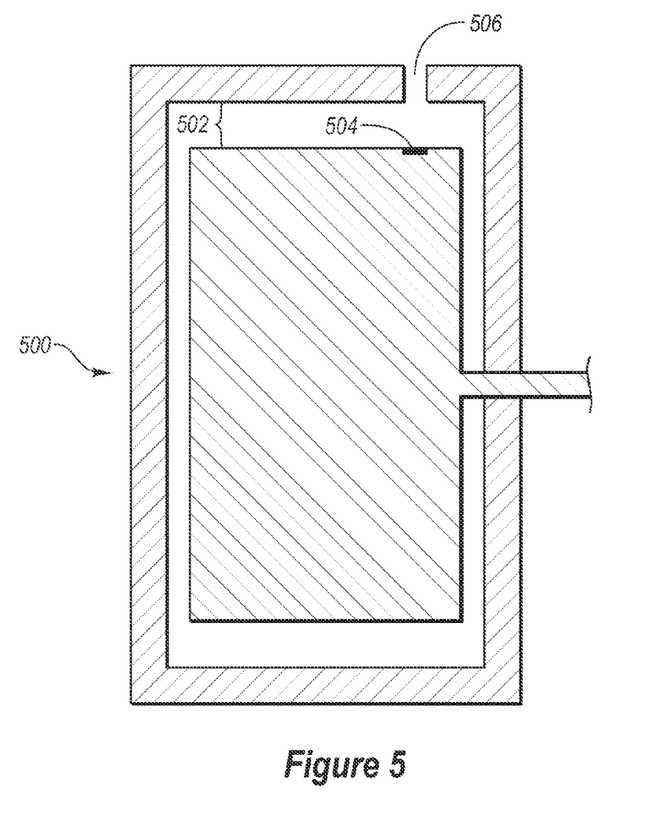
FIG. 5 shows an illustrative embodiment of an energy storage device with an indicia to measure rotation.

FIG. 5 shows an illustrative embodiment of an energy storage device 500 with an indicia 504 to measure rotation. The energy storage device 500 is an example of the energy storage device 120. The energy storage device 500 includes an indicia 504 that can be monitored via a port 506. The indicia 504 can be placed or located in any channel of the flywheel or at another location and monitored via the port 506. For example, the indicia 504 may be located on a side 510 of the flywheel 508. The indicia 504 may be reflective such that rotation of the flywheel 508 can be monitored optically with an optical sensor. The indicia 504 may be magnetic such that pulses can be counted as the flywheel rotates. The port 506 may be sealed or may also function as one of the other ports as described herein.

Figure 6:
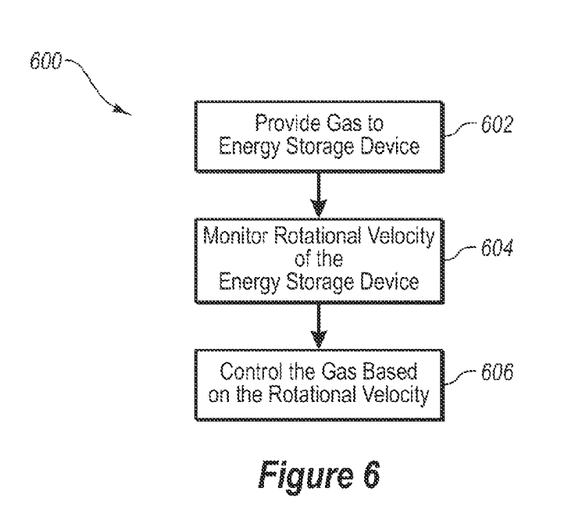
FIG. 6 shows an illustrative embodiment of a method for providing a gas bearing to an energy storage device.

FIG. 6 shows an illustrative embodiment of a method 600 for providing a gas bearing to an energy storage device. In block 602, a gas is provided to an energy storage device. The gas can be provided at atmospheric pressure or at a different pressure. Once provided to the energy storage device, the rotation of a flywheel in the energy storage device helps create a gas bearing between the rotating mass and a journal. The gas bearing can reduce friction and thus reduce energy leakage. Because the gas bearing is provided at pressure, a compressive force directed towards the axis of the energy storage device is generated. The compressive force reduces the tensile strain on the flywheel and enables higher rotational velocities, which results in increased energy storage.

In block 604, the rotational velocity of the energy storage device (or more specifically of the rotating mass) is monitored. The rotational velocity can be monitored, for example, using an indicia that may be mounted on the flywheel. The rotational velocity can be determined using the circumference or diameter of the flywheel and the rate of rotation as determined from the indicia.

In block 606, the gas used to generate the gas bearing is controlled based on the rotational velocity. Detecting the rotational velocity of the flywheel can be used as a feedback signal to control the energy storage device and more specifically to control the gas. For example, the energy storage system may transition to a higher density gas at higher sensed rotational velocities or transition to a lower density gas as the rotational velocity decreases. The energy storage system may transition the gas bearing to a hydraulic bearing at certain rotational velocities. The detected rotational velocity can also be used to control the flow rate of the gas, the pressure of the gas, and/or the type of gas provided to form the gas bearing.

Use of the gas bearing to support the flywheel provides significantly lower frictional losses compared to solid bearings (e.g., ball bearings, needle bearings). The gas bearing can also reduce energy leakage. Further, providing the compressive force with the gas bearing reduces tensile strength concerns because the flywheel is supported under compressive force from its diameter. The journal may be sized and configured to provide the necessary compressive force support. As a result, the design of the flywheel is less constrained by the tensile strength of the flywheel and can be optimized for other factors such as cost and inertia.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. An energy storage device comprising:
    a journal that includes:
        a chamber;
        at least one gas inlet port in a first side of the journal, the at least one gas inlet port configured to introduce gas into the chamber; and
        at least one gas outlet port to vent the gas from the chamber;
    a flywheel disposed in the chamber of the journal, wherein the flywheel is configured to rotate about an axis and to store energy kinetically and the first side of the journal is substantially parallel to the axis of rotation of the flywheel, the flywheel comprising an outer face that includes gas bearing features formed therein, the gas bearing features including a gas inlet channel and a gas outlet channel that are substantially parallel to each other; and
    a gas bearing between the journal and the flywheel and formed by the gas introduced by the at least one gas inlet port, wherein the gas bearing is formed to exert a compressive force on the flywheel.

2. The energy storage device of claim 1, wherein the gas bearing features comprise
    a plurality of bearing pads.

3. The energy storage device of claim 2, wherein the gas bearing features further include a plurality of transverse channels configured to couple the gas inlet channel with the gas outlet channel, wherein
    the gas inlet channel is configured to receive the gas from the at least one gas inlet port and is disposed continuously around a circumference of the flywheel and
    the gas outlet channel is disposed around the circumference of the flywheel and is formed to communicate with the at least one gas outlet port.

4. The energy storage device of claim 3, further comprising at least one vacuum channel configured to keep a portion of the chamber at a first pressure that is lower than a second pressure in the gas outlet channel, the portion of the chamber not including the gas bearing between the flywheel and the journal.

5. The energy storage device of claim 1, wherein the compressive force is between 7000 PSI (482.63 bar) and 9000 PSI (620.53 bar).

6. The energy storage device of claim 1, wherein the compressive force enables a rotational velocity of the flywheel to be increased.

7. The energy storage device of claim 1, wherein the gas bearing is formed in a gap between the outer face of the flywheel and an inner face of the journal.

8. The energy storage device of claim 7, wherein rotation of the flywheel hydrodynamically increases pressure of the gas.

9. The energy storage device of claim 1, further comprising an indicia mounted on the flywheel, the indicia usable to determine a rotational velocity of the flywheel.

10. An energy storage system comprising:
    a gas supply to provide at least one gas;
    an energy storage device coupled to the gas supply and including:
        a journal that includes:
            a chamber;
            at least one gas inlet port to receive the at least one gas from the gas supply and to introduce the at least one gas into the chamber; and
            at least one gas outlet port to vent the at least one gas from the chamber; and
        a flywheel disposed inside the chamber, the flywheel including an outer face parallel to an axis of rotation of the flywheel, the outer face comprising gas bearing features that include at least one gas inlet channel to receive the at least one gas and at least one gas output channel, the at least one gas inlet channel running substantially perpendicular to the axis of rotation of the flywheel and being configured to direct the at least one gas received therein substantially perpendicular to the axis of rotation of the flywheel, wherein the at least one gas is provided to the energy storage device to form a gas bearing that exerts a compressive force on the flywheel; and
    a controller to control a flow of the at least one gas to the energy storage device.

11. The energy storage system of claim 10, wherein a gap is formed between the outer face of the flywheel and an inner face of the journal and the gas bearing is formed in the gap to exert the compressive force towards the axis of rotation of the flywheel.

12. The energy storage system of claim 11, wherein the journal further comprises at least one vacuum port to create a first pressure in a portion of the chamber that is lower than a second pressure of the gas bearing.

13. The energy storage system of claim 10, wherein the gas bearing features further include:
   a plurality of transverse channels configured to couple the at least one gas inlet channel with the at least one gas outlet channel;
   a plurality of first bearing pads, wherein the at least one gas seeps into gaps between the plurality of first bearing pads and an inner face of the journal to create the gas bearing; and
   at least one vacuum channel separated from the at least one gas outlet channel and the at least one gas inlet channel by a second bearing pad.

14. The energy storage system of claim 10, further comprising an indicia mounted on the flywheel and usable to determine a rotational velocity of the flywheel, wherein the controller is configured to control the flow of the at least one gas to the energy storage device based on the rotational velocity of the flywheel.

15. An energy storage device comprising:
   a journal comprising:
      a chamber;
      at least one gas inlet port to introduce gas into the chamber; and
      at least one gas outlet port to vent the gas from the chamber; and
   a flywheel disposed in the chamber, an outer face of the flywheel comprising:
      a gas inlet channel substantially aligned with the at least one gas inlet port and configured to receive the gas from the at least one gas inlet port, the gas inlet channel configured to run substantially perpendicular to an axis of rotation of the flywheel and being configured to direct the gas received therein substantially perpendicular to the axis of rotation of the flywheel; and
      a gas outlet channel substantially aligned with the at least one gas outlet port.

16. The energy storage device of claim 15, wherein the outer face of the flywheel further comprises
   at least one transverse channel configured to couple the gas inlet channel with the gas outlet channel.

17. The energy storage device of claim 16, wherein the gas inlet channel and the gas outlet channel are substantially parallel to each other and the outer face of the flywheel further includes:
   a plurality of first bearing pads, wherein the gas seeps into first gaps between the plurality of first bearing pads and an inner face of the journal to create a gas bearing that exerts a compressive force on the flywheel; and
   at least one vacuum channel separated from the gas outlet channel and the gas inlet channel by a second bearing pad, the vacuum channel configured to keep a portion of the chamber at a first pressure that is lower than a second pressure in the gas outlet channel.

18. The energy storage device of claim 17, wherein the portion of the chamber kept at the first pressure includes a second gap between a portion of the outer face of the flywheel that is perpendicular to the axis of rotation of the flywheel and the inner face of the journal.

19. The energy storage device of claim 15, wherein the outer face of the flywheel includes a plurality of bearing pads, wherein the gas introduced into the chamber seeps into gaps between the plurality of bearing pads and an inner face of the journal to form a gas bearing between the flywheel and the journal.

* * * * *